United States Patent
Ahn et al.

(10) Patent No.: US 11,225,239 B2
(45) Date of Patent: Jan. 18, 2022

(54) HYBRID VEHICLE AND METHOD FOR CONTROLLING THE SAME

(71) Applicants: Hyundai Motor Company, Seoul (KR); Kia Motors Corporation, Seoul (KR)

(72) Inventors: Hyun Mo Ahn, Seoul (KR); Sang Yoon Shin, Seoul (KR); Jae Yui Kim, Seoul (KR); Yun Chan Heo, Seoul (KR); Min Kyu Lee, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 340 days.

(21) Appl. No.: 16/428,126

(22) Filed: May 31, 2019

(65) Prior Publication Data

US 2020/0172080 A1 Jun. 4, 2020

(30) Foreign Application Priority Data

Nov. 29, 2018 (KR) .......................... 10-2018-0151075

(51) Int. Cl.
| | |
|---|---|
| *B60W 20/00* | (2016.01) |
| *B60W 10/06* | (2006.01) |
| *B60W 10/26* | (2006.01) |
| *B60K 6/22* | (2007.10) |
| *F02D 35/00* | (2006.01) |
| *G05D 23/19* | (2006.01) |

(52) U.S. Cl.
CPC .............. *B60W 20/00* (2013.01); *B60K 6/22* (2013.01); *B60W 10/06* (2013.01); *B60W 10/26* (2013.01); *F02D 35/0015* (2013.01); *B60W 2400/00* (2013.01); *B60W 2510/244* (2013.01); *B60W 2710/06* (2013.01); *B60W 2710/244* (2013.01); *B60Y 2200/92* (2013.01); *F02D 2400/14* (2013.01); *G05D 23/19* (2013.01)

(58) Field of Classification Search
CPC ..................................................... B60W 20/00
See application file for complete search history.

(56) References Cited

U.S. PATENT DOCUMENTS

| | | | | |
|---|---|---|---|---|
| 8,335,604 B2* | 12/2012 | Jacques | ................... | B60K 6/48 |
| | | | | 701/22 |
| 2020/0172080 A1* | 6/2020 | Ahn | ........................ | B60K 6/22 |

* cited by examiner

*Primary Examiner* — Michael A Berns
(74) *Attorney, Agent, or Firm* — Morgan, Lewis & Bockius LLP

(57) ABSTRACT

A hybrid vehicle may include an engine controller that determines an activation state of an oxygen sensor when the engine controller is requested to operate an engine and controls a voltage applied to the oxygen sensor depending on whether or not the oxygen sensor is in an activated state, and a vehicle controller that controls a voltage of a battery of the hybrid vehicle and applies the voltage of the battery to the engine controller. The engine controller outputs an activation demand signal for the oxygen sensor to be activated to the vehicle controller when it is determined that the oxygen sensor is not in the activated state.

15 Claims, 5 Drawing Sheets

HYBRID VEHICLE AND METHOD FOR CONTROLLING THE SAME

CROSS-REFERENCE TO RELATED APPLICATION

This application claims the benefit of priority to Korean Patent Application No. 10-2018-0151075, filed on Nov. 29, 2018 in the Korean Intellectual Property Office, the entire contents of which are incorporated herein by reference.

TECHNICAL FIELD

The present disclosure relates to a hybrid vehicle and a method for controlling the same.

BACKGROUND

A hybrid vehicle may operate in an electric vehicle (EV) mode in which the vehicle travels using a motor or in a hybrid electric vehicle (HEV) mode in which the vehicle travels using an engine and the motor.

In the HEV mode, the hybrid vehicle operates the engine by burning fuel. In order to prevent environmental pollution due to exhaust gas caused by the burning of fuel, the vehicle controls the air-fuel ratio using an oxygen sensor to maintain the concentration of oxygen in the exhaust gas at a predetermined level or higher. Hence, for a transition from the EV mode, in which the engine is turned off, to the HEV mode, the oxygen sensor has to be activated to operate the engine.

Because the oxygen sensor is activated at a predetermined temperature or more, the vehicle applies a maximum voltage to a heater of the oxygen sensor for a predetermined period of time to minimize heating time of the oxygen sensor.

However, because the vehicle controls the application of the maximum voltage for heating the oxygen sensor with respect to the predetermined time period, the vehicle may continually apply the maximum voltage even after the oxygen sensor is activated, or may lower the voltage applied to the heater, with the oxygen sensor deactivated.

SUMMARY

The present disclosure has been made to solve the above-mentioned problems occurring in the prior art while advantages achieved by the prior art are maintained intact.

An aspect of the present disclosure provides a hybrid vehicle and a control method thereof for minimizing time required for activating an oxygen sensor while minimizing unnecessary energy consumption through cooperative control between a hybrid control unit (HCU) and an engine control unit (ECU) of the hybrid vehicle, thereby improving fuel economy.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a hybrid vehicle may include an engine controller that determines an activation state of an oxygen sensor when the engine controller is requested to operate an engine and controls a voltage applied to the oxygen sensor depending on whether or not the oxygen sensor is in an activated state, and a vehicle controller that controls a voltage of a battery of the hybrid vehicle and applies the voltage of the battery to the engine controller.

The engine controller may output an activation demand signal for the oxygen sensor to be activated to the vehicle controller when it is determined that the oxygen sensor is not in the activated state.

The engine controller may determine that the oxygen sensor is in the activated state, when temperature of the oxygen sensor is higher than or equal to a threshold temperature.

The vehicle controller may apply a maximum voltage of the battery to the engine controller in response to the activation demand signal for the oxygen sensor to be activated.

The engine controller may apply the maximum voltage, which has been applied from the vehicle controller, to a heater of the oxygen sensor when it is determined that the oxygen sensor is not in the activated state.

The engine controller may perform variable control on the voltage applied to the oxygen sensor in a range in which the oxygen sensor remains at a threshold temperature, when the oxygen sensor is in the activated state.

The engine controller may stop outputting of the activation demand signal, when it is determined that the oxygen sensor is in the activated state.

The engine controller may control an operation of the engine when the oxygen sensor is in the activated state.

The hybrid vehicle may further include a temperature sensor that measures temperature of the oxygen sensor.

According to another aspect of the present disclosure, a method for controlling a hybrid vehicle may include steps of determining, by an engine controller, an activation state of an oxygen sensor when the engine controller is requested to operate an engine, controlling, by an engine controller, a voltage applied to the oxygen sensor depending on whether or not the oxygen sensor is in an activated state, and outputting, by an engine controller, an activation demand signal for the oxygen sensor to a vehicle controller, when it is determined that the oxygen sensor is not in the activated state.

BRIEF DESCRIPTION OF THE DRAWINGS

The above and other objects, features and advantages of the present disclosure will be more apparent from the following detailed description taken in conjunction with the accompanying drawings.

Figure 1:
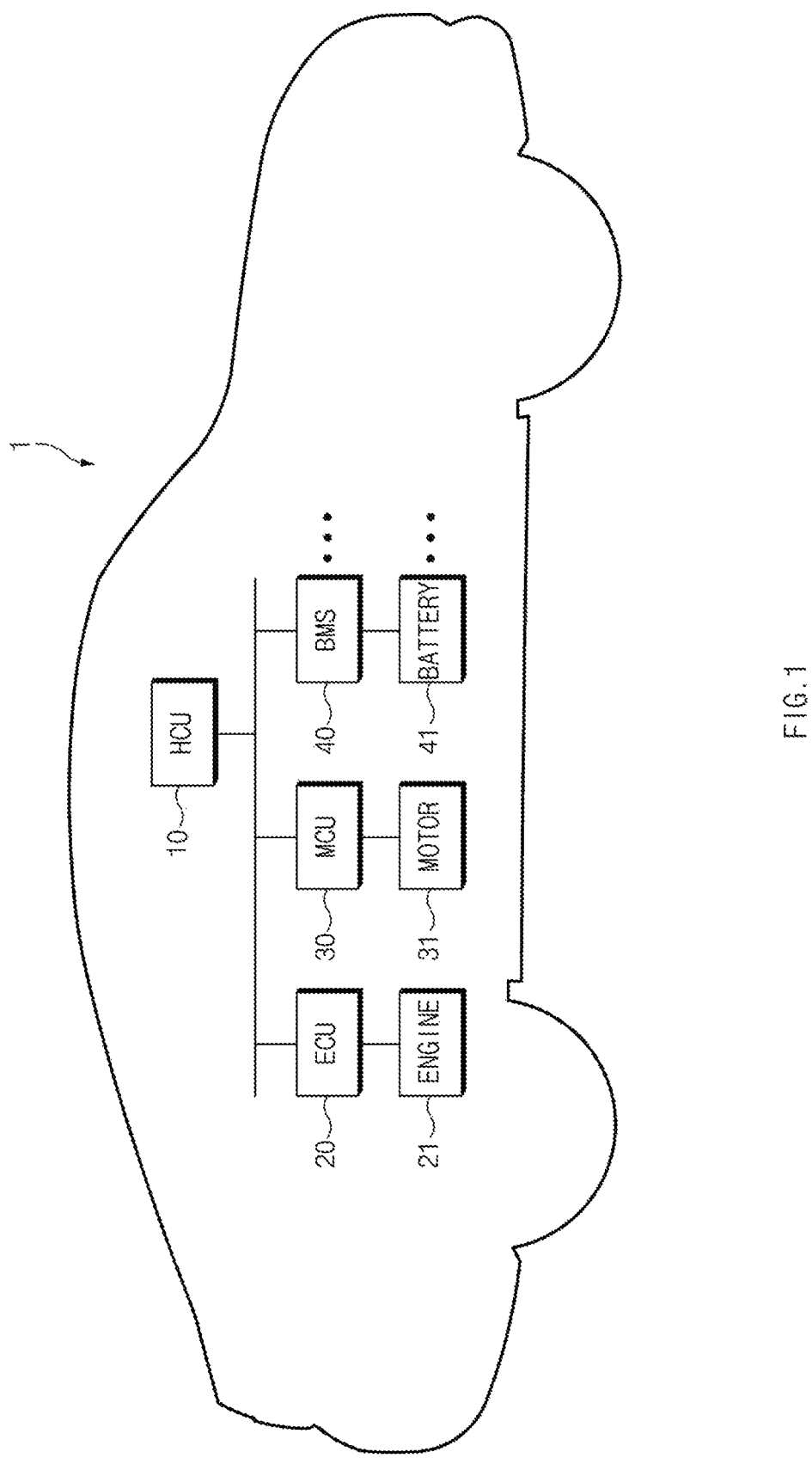
FIG. 1 is an illustrative view showing a hybrid vehicle according to an exemplary embodiment of the present disclosure.

It is to be understood that the appended drawings are not necessarily drawn to scale, and are presenting a somewhat simplified representation of various features illustrative of the basic principles of the disclosure. The specific design features of the present disclosure as disclosed herein, including, for example, specific dimensions, orientations, locations, and shapes will be determined in part by the particularly intended application and use environment.

DETAILED DESCRIPTION

Hereinafter, some exemplary embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the exemplary embodiment of the present disclosure, a detailed description of well-known features or functions will be ruled out in order not to unnecessarily obscure the gist of the present disclosure.

In describing the components in the exemplary embodiments of the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

The present disclosure relates to a hybrid vehicle and a method for controlling the same. Here, the hybrid vehicle may include a plug-in hybrid vehicle.

FIG. 1 is an illustrative view showing a configuration of a hybrid vehicle 1 according to an exemplary embodiment of the present disclosure.

Referring to FIG. 1, the hybrid vehicle 1 may include a vehicle controller, for example, a hybrid control unit (HCU) 10 as a high-level control unit. In addition, the hybrid vehicle 1 may include an engine controller (e.g., an engine control unit (ECU) 20), a motor control unit (MCU) 30, and a battery management system (BMS) 40 as low-level control units.

Each of the vehicle controller, engine controller, MCU 30, and the BMS 40 may include at least one non-transitory memory in which programs performing the foregoing and following operations are stored and at least one processor (e.g., computer, microprocessor, CPU, ASIC, circuitry, etc.) executing the stored programs. Herein, the memory and the processor may be implemented as separate semiconductor circuits. Alternatively, the memory and the processor may be implemented as a single integrated semiconductor circuit. The processor may embody one or more processor(s).

The HCU 10 provides overall control of the hybrid vehicle 1. The HCU 10 is connected with the low-level control units in the hybrid vehicle 1 via an in-vehicle network. The HCU 10 collects and analyzes information of the low-level control units and performs integrated control. For example, the HCU 10 may perform cooperative control with the low-level control units and may control the power outputs of an engine 21 and a motor 31.

The ECU 20 is connected with the HCU 10 via the in-vehicle network and controls an overall operation of the engine 21 in response to a demand of the HCU 10. Accordingly, the on/off of the engine 21 and the output torque thereof are controlled by the ECU 20. Furthermore, the ECU 20 provides an operational state of the engine 21 to the HCU 10.

The MCU 30 controls an operation and torque of the motor 31 in response to a demand of the HCU 10. In addition, the MCU 30 controls an overall operation of the motor 31 according to a torque demand signal of a driver, a driving mode of the vehicle 1, and a state of charge (SOC) of a battery 41. Accordingly, the motor 31 operates under the control of the MCU 30 to adjust the output torque. In addition, the motor 31 may perform regenerative braking under the control of the MCU 30.

The BMS 40 manages a state of the battery 41 and provides information about the state of the battery 41 to the HCU 10 via the in-vehicle network.

For example, the high-level control unit and the low-level control units may be connected together via a CAN communication line and may exchange information with each other.

When travelling in the EV mode, the hybrid vehicle 1 turns off the engine 21 and stops fuel injection of the engine 21. Meanwhile, when the hybrid vehicle 1 transitions from the EV mode to the HEV mode, the HCU 10 requests the ECU 20 to operate the engine 21, and the ECU 20 operates the engine 21 in response to the request of the HCU 10. In this case, the ECU 20 identifies an activation state of an oxygen sensor 50 before operating the engine 21 and operates the engine 21 after the oxygen sensor 50 is activated. Meanwhile, in the case where the oxygen sensor 50 is not activated, the ECU 20 requests cooperative control from the HCU 10. In response to the request of the ECU 20, the HCU 10 applies a maximum voltage to the ECU 20 to raise the temperature of the oxygen sensor 50.

A detailed structure and operation for voltage control according to an activation state of the oxygen sensor 50 will be described below with reference to FIG. 2.

Figure 2:
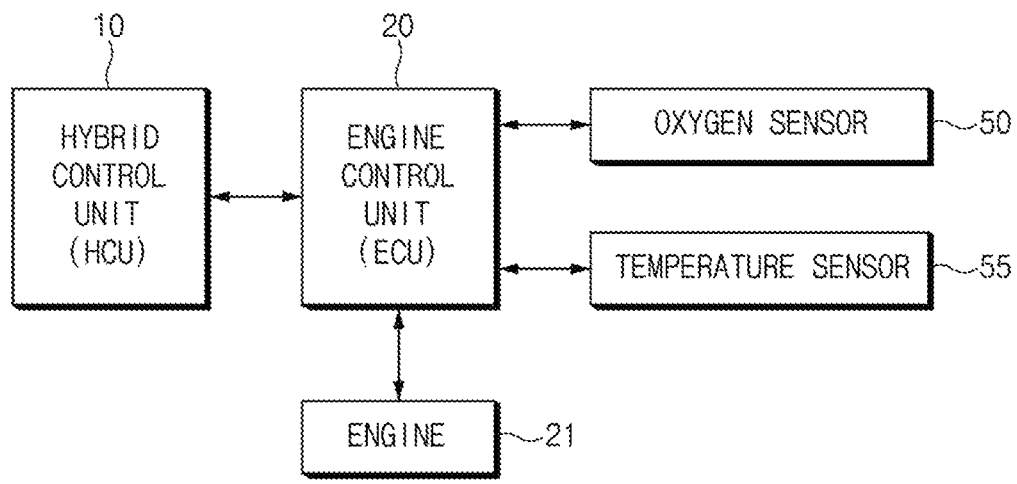
FIG. 2 is an illustrative view showing a detailed configuration of the hybrid vehicle according to an exemplary embodiment of the present disclosure.

Referring to FIG. 2, when the hybrid vehicle 1 transitions from the EV mode to the HEV mode, the HCU 10 requests the ECU 20 to operate the engine 21.

In this case, the ECU 20, before operating the engine 21, determines whether the oxygen sensor 50 is in an activated state. Here, when the temperature of the oxygen sensor 50 is higher than or equal to a threshold temperature, the ECU 20 may determine that the oxygen sensor 50 is in an activated state, and when the temperature of the oxygen sensor 50 is lower than the threshold temperature, the ECU 20 may determine that the oxygen sensor 50 is in a deactivated state. For example, when the temperature of the oxygen sensor 50, which is measured by a temperature sensor 55, is higher than or equal to 500 degrees Celsius, the ECU 20 may determine that the oxygen sensor 50 is in an activated state. Here, the temperature sensor 55 may be provided in the interior of the oxygen sensor 50 or on the exterior of the oxygen sensor 50.

When the temperature of the oxygen sensor 50 is higher than or equal to the threshold temperature, the ECU 20 receives feedback on the concentration of oxygen in exhaust gas from the oxygen sensor 50 and controls the air-fuel ratio of the engine 21. In this case, the ECU 20 may adjust the voltage applied to the oxygen sensor 50 in the range in which the oxygen sensor 50 remains at the threshold temperature.

Meanwhile, when the temperature of the oxygen sensor 50 is lower than the threshold temperature, the ECU 20 may determine that the oxygen sensor 50 is in a deactivated state and may transmit an activation demand signal for the oxygen sensor 50 to be activated to the HCU 10. In this case, the HCU 10 applies the maximum voltage to the ECU 20 in response to the demand of the ECU 20. For example, the HCU 10 may apply a voltage of 15 V to the ECU 20.

The ECU 20 applies the maximum voltage, which is applied from the HCU 10, to the oxygen sensor 50. In this case, the oxygen sensor 50 raises the temperature of a heater 51 by the voltage applied from the ECU 20, thereby raising the temperature of the oxygen sensor 50.

Figure 3:
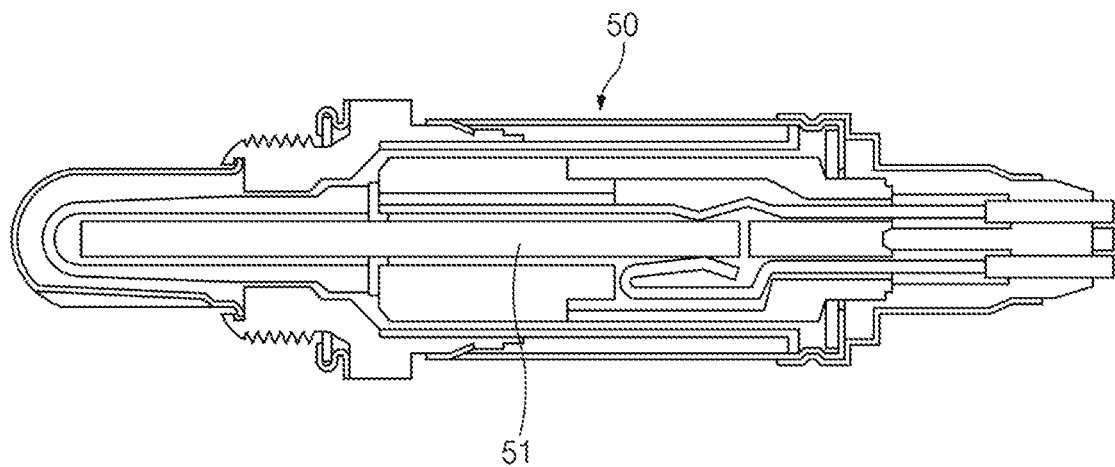
FIG. 3 is an illustrative view showing a structure of an oxygen sensor according to an exemplary embodiment of the present disclosure.

Here, the oxygen sensor 50 measures the amount of oxygen contained in exhaust gas and delivers the output voltage to the ECU 20. The oxygen sensor 50 is a sensor that consistently exchanges information with the ECU 20 and performs a feedback operation to maintain the theoretical air-fuel ratio under a predetermined operating condition. For example, the oxygen sensor 50 may be a zirconia oxygen sensor. The structure of the oxygen sensor 50 of a zirconia type will be described below with reference to FIG. 3.

The oxygen sensor 50 has a feature of generating an electromotive force when being heated. The oxygen sensor 50 is formed in a tube shape that is closed on one side. The inside of the oxygen sensor 50 makes contact with the air, and the outside of the oxygen sensor 50 makes contact with exhaust gas in the passage between the oxygen sensor 50 and a protective cover therearound. The oxygen sensor 50 is equipped with inner and outer electrodes and generates an electromotive force by the difference in oxygen concentration between inside and outside the pipe. When a voltage signal generated by the oxygen sensor 50 is sent to the ECU 20, the ECU 20 controls the air-fuel ratio while feeding back the supply of fuel by the voltage signal.

The oxygen sensor 50 operates nominally in a predetermined temperature range. However, the oxygen sensor 50 is likely to fail at a very high temperature. Meanwhile, the oxygen sensor 50 may not operate at a predetermined temperature or less. In this case, the ECU 20 may apply a voltage to the heater 51 of the oxygen sensor 50 to rapidly raise the temperature of the oxygen sensor 50.

When the ECU 20 applies the maximum voltage to the oxygen sensor 50 so that the oxygen sensor 50 reaches the threshold temperature or more, the ECU 20 no longer outputs the activation demand signal for the oxygen sensor 50 to be activated to the HCU 10. Thereafter, in order to improve fuel economy, the ECU 20 does not apply the maximum voltage to the oxygen sensor 50, but adjusts the voltage applied to the oxygen sensor 50 in the range in which the oxygen sensor 50 remains at the threshold temperature.

Figure 4:
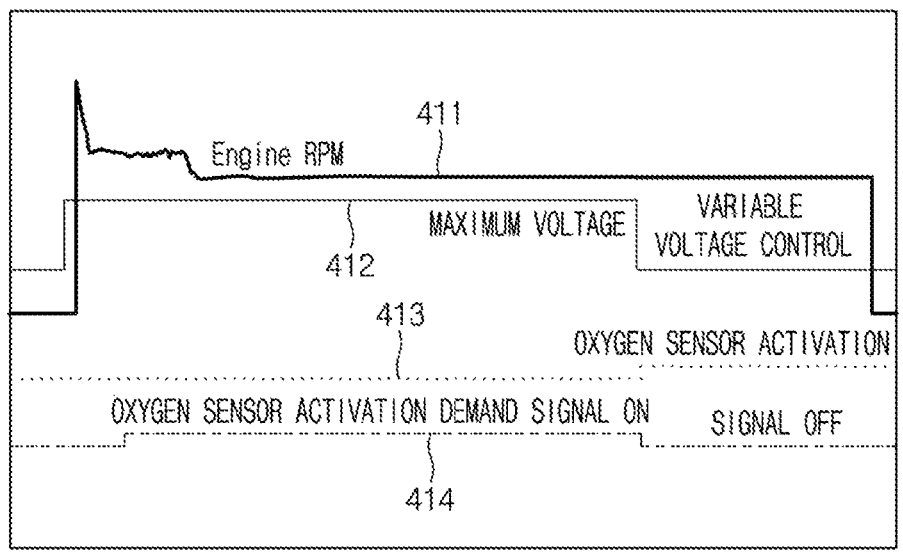
FIG. 4 is an illustrative view showing operation signals of a hybrid apparatus according to an exemplary embodiment of the present disclosure.

Signals for voltage control of the HCU 10 and the ECU 20 according to an activation state of the oxygen sensor 50 may be represented as illustrated in FIG. 4.

Referring to FIG. 4, reference numeral 411 denotes an engine RPM, reference numeral 412 denotes a voltage signal applied to the oxygen sensor 50, reference numeral 413 denotes an activation state of the oxygen sensor 50, and reference numeral 414 denotes an activation demand signal for the oxygen sensor 50 to be activated.

As illustrated in FIG. 4, when the oxygen sensor 50 is activated as the temperature of the oxygen sensor 50 reaches the threshold temperature or more, the ECU 20 does not output the activation demand signal for the oxygen sensor 50 to be activated, as represented by reference numeral 414. Accordingly, as represented by reference numeral 412, after the activation of the oxygen sensor 50, the ECU 20 performs voltage control based on fuel economy in the range in which the oxygen sensor 50 remains at the threshold temperature, thereby minimizing unnecessary energy consumption.

Operations of the above-configured apparatus according to the present disclosure will be described below in more detail.

Figure 5:
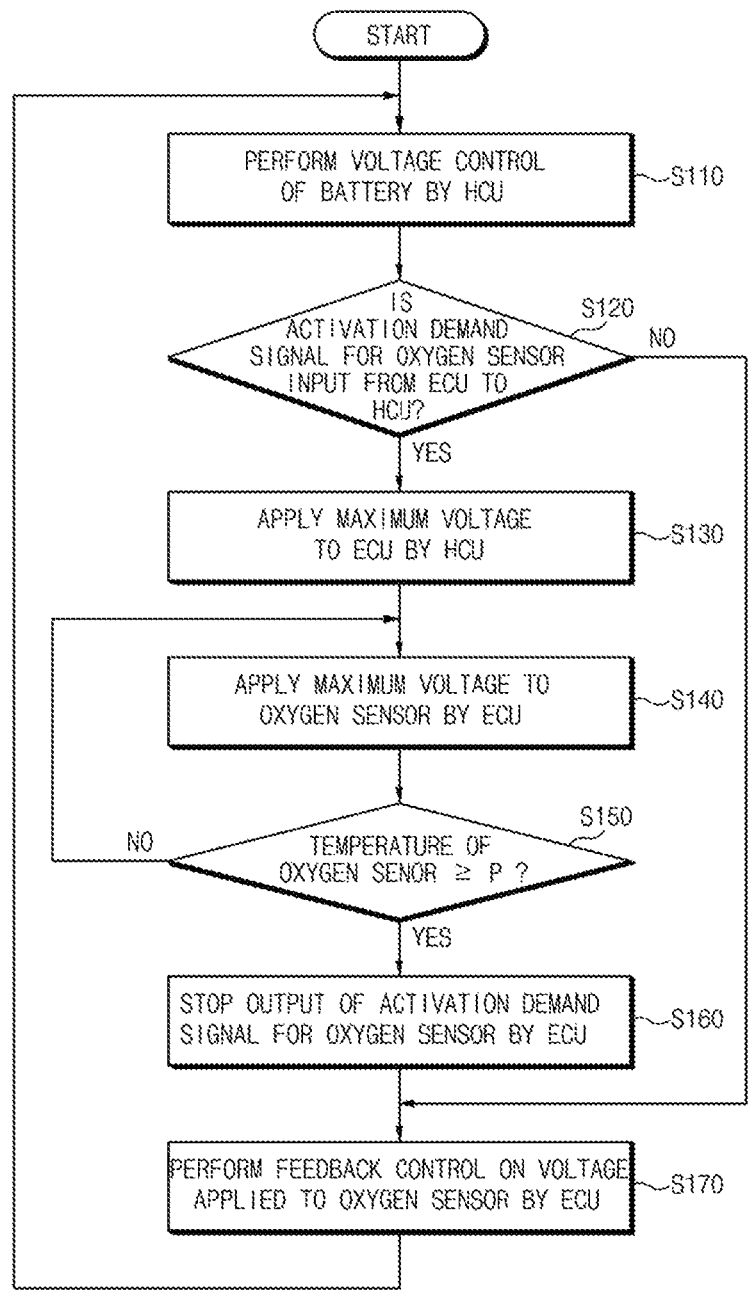
FIG. 5 is a flowchart illustratively showing a method for controlling the hybrid vehicle according to an exemplary embodiment of the present disclosure.

FIG. 5 is a flowchart illustratively showing a method for controlling the hybrid vehicle 1 according to an exemplary embodiment of the present disclosure. More specifically, FIG. 5 illustrates a voltage control method according to an activation state of the oxygen sensor 50.

Referring to FIG. 5, when the HCU 10 receives an activation demand signal for the oxygen sensor 50 to be activated from the ECU 20 (Step S120) during voltage control of the battery 41 (Step S110), the HCU 10 applies the maximum voltage to the ECU 20 (Step S130). For example, the battery 41 may be an auxiliary battery. Here, the maximum voltage of the auxiliary battery may be about 15V.

The ECU 20 applies the maximum voltage, which is applied from the HCU 10, to the heater 51 of the oxygen sensor 50 (Step S140).

Thereafter, the ECU 20 measures the temperature of the oxygen sensor 50. If the temperature of the oxygen sensor 50 is lower than the threshold temperature (Step S150), the ECU 20 continually applies the maximum voltage to the heater 51 of the oxygen sensor 50 (Step S140).

Meanwhile, when the temperature of the oxygen sensor 50 reaches the threshold temperature or more (Step S150), the ECU 20 stops the output of the activation demand signal for the oxygen sensor 50 to be activated to the HCU 10 (Step S160).

Thereafter, the ECU 20 performs variable control on the voltage in the range in which the oxygen sensor 50 remains at the threshold temperature (Step S170).

Steps S110 to S170 may be repeatedly performed while the engine 21 is operated.

According to the present disclosure, the hybrid vehicle and the control method thereof minimize the time required for activating the oxygen sensor while minimizing unnecessary energy consumption through the cooperative control between the HCU and the ECU of the hybrid vehicle, thereby improving fuel economy.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by these exemplary embodiments. The scope of the present disclosure should be construed on the basis of the accompanying claims, and all the technical ideas within the scope equivalent to the claims should be included in the scope of the present disclosure.

What is claimed is:

1. A hybrid vehicle comprising:
    an engine controller configured to determine an activation state of an oxygen sensor when the engine controller is requested to operate an engine and to control a voltage applied to the oxygen sensor depending on whether or not the oxygen sensor is in an activated state; and
    a vehicle controller configured to control a voltage of a battery of the hybrid vehicle and apply the voltage of the battery to the engine controller,
    wherein the engine controller outputs an activation demand signal for the oxygen sensor to be activated to the vehicle controller when it is determined that the oxygen sensor is not in the activated state.

2. The hybrid vehicle of claim 1, wherein the engine controller determines that the oxygen sensor is in the activated state, when temperature of the oxygen sensor is higher than or equal to a threshold temperature.

3. The hybrid vehicle of claim 1, wherein the vehicle controller applies a maximum voltage of the battery to the engine controller in response to the activation demand signal for the oxygen sensor to be activated.

4. The hybrid vehicle of claim 3, wherein the engine controller applies the maximum voltage, which has been applied from the vehicle controller, to a heater of the oxygen sensor when it is determined that the oxygen sensor is not in the activated state.

5. The hybrid vehicle of claim 3, wherein the engine controller performs variable control on the voltage applied to the oxygen sensor in a range in which the oxygen sensor remains at a threshold temperature, when the oxygen sensor is in the activated state.

6. The hybrid vehicle of claim 1, wherein the engine controller stops outputting of the activation demand signal, when it is determined that the oxygen sensor is in the activated state.

7. The hybrid vehicle of claim 1, wherein the engine controller controls an operation of the engine when the oxygen sensor is in the activated state.

8. The hybrid vehicle of claim 1, further comprising:
a temperature sensor configured to measure temperature of the oxygen sensor.

9. A method for controlling a hybrid vehicle, the method comprising steps of:
determining, by an engine controller, an activation state of an oxygen sensor when the engine controller is requested to operate an engine;
controlling, by the engine controller, a voltage applied to the oxygen sensor depending on whether or not the oxygen sensor is in an activated state; and
outputting, by the engine controller, an activation demand signal for the oxygen sensor to be activated to a vehicle controller, when it is determined that the oxygen sensor is not in the activated state.

10. The method of claim 9, wherein the step of determining the activation state of the oxygen sensor includes:
determining that the oxygen sensor is in the activated state, when temperature of the oxygen sensor is higher than or equal to a threshold temperature.

11. The method of claim 9, further comprising:
applying, by the vehicle controller, a maximum voltage of a battery to the engine controller in response to the activation demand signal for the oxygen sensor to be activated.

12. The method of claim 11, further comprising:
applying, by the engine controller, the maximum voltage, which has been applied from the vehicle controller, to a heater of the oxygen sensor.

13. The method of claim 11, wherein the step of controlling the voltage applied to the oxygen sensor includes:
performing variable control on the voltage applied to the oxygen sensor in a range in which the oxygen sensor remains at a threshold temperature, when the oxygen sensor is in the activated state.

14. The method of claim 9, further comprising:
stopping the step of outputting the activation demand signal by the engine controller, when it is determined that the oxygen sensor is in the activated state.

15. The method of claim 9, further comprising:
controlling an operation of the engine when the oxygen sensor is in the activated state.

* * * * *